United States Patent [19]
Matsunaga et al.

[11] Patent Number: 5,910,539
[45] Date of Patent: Jun. 8, 1999

[54] POLYOLEFIN COMPOSITION AND MOLDED ARTICLE THEREOF

[75] Inventors: Shin-ya Matsunaga; Hiroshi Wakumoto, both of Yamaguchi, Japan

[73] Assignee: Mitsui Chemicals, Inc., Tokyo, Japan

[21] Appl. No.: 08/836,291

[22] PCT Filed: Sep. 13, 1996

[86] PCT No.: PCT/JP96/02641

§ 371 Date: May 6, 1997

§ 102(e) Date: May 6, 1997

[87] PCT Pub. No.: WO97/10299

PCT Pub. Date: Mar. 20, 1997

[30] Foreign Application Priority Data

Sep. 14, 1995 [JP] Japan ..................... 7-236761
Dec. 28, 1995 [JP] Japan ..................... 7-344108

[51] Int. Cl.$^6$ ............... C08L 53/00; C08L 23/00
[52] U.S. Cl. .................. 525/88; 525/95; 525/240
[58] Field of Search ................. 525/240, 88, 95

[56] References Cited

U.S. PATENT DOCUMENTS

| | | | |
|---|---|---|---|
| 4,842,930 | 6/1989 | Schinkel et al. | 525/240 |
| 5,639,829 | 6/1997 | Yamaguchi et al. | 525/240 |

FOREIGN PATENT DOCUMENTS

| | | | |
|---|---|---|---|
| 4107665 | 9/1992 | Germany | 525/240 |
| 58-59247 | 4/1983 | Japan | 525/240 |

*Primary Examiner*—Edward J. Smith
*Attorney, Agent, or Firm*—Birch, Stewart, Kolasch & Birch, LLP

[57] ABSTRACT

The polyolefin composition of the present invention comprises 45 to 90 parts by weight of a propylene polymer (A) of 0.5 to 10 dl/g in [η] and at least 100° C. in Tm comprising 100 to 80 mol % of propylene units, 0 to 10 mol % of ethylene units and 0 to 15 mol % of units derived from an α-olefin having 4 to 12 carbon atoms; 5 to 40 parts by weight of an ethylene/α-olefin copolymer (B) of 0.5 to 10 dl/g in [η] comprising 70 to 95 mol % of ethylene units and 5 to 30 mol % of units derived from an α-olefin having 4 to 12 carbon atoms; and 2 to 25 parts by weight of a propylene/α-olefin/ethylene terpolymer (C) of 0.5 to 10 dl/g in [η] comprising 40 to 77 mol % of propylene units, 20 to 40 mol % of units derived from an α-olefin having 4 to 12 carbon atoms and 2 to 20 mol % of ethylene units, provided that the total of components (A), (B) and (C) is 100 parts by weight. This polyolefin composition is excellent in flexibility, transparency, mechanical strength and heat resistance, and these properties are not seriously deteriorated even when the composition is exposed to high temperatures. The polyolefin composition can suitably be used for packaging articles, especially, medical blown bottles which are excellent in mechanical strength, flexibility and transparency and which are sterilized at high temperatures (e.g., 100° C. or higher).

7 Claims, No Drawings

POLYOLEFIN COMPOSITION AND MOLDED ARTICLE THEREOF

TECHNICAL FIELD

The present invention relates to a polyolefin composition which is excellent in mechanical strength, flexibility and transparency and further relates to a molded article of the polyolefin composition. More particularly, the present invention is concerned with a polyolefin composition having excellent mechanical strength, flexibility and transparency and a molded article such as a film or a container which is composed of the polyolefin composition.

BACKGROUND ART

Polyolefins such as propylene polymers are so excellent in rigidity, heat resistance and impact resistance that they are used as various molded articles and in a variety of fields.

Known methods for-further enhancing the properties, such as the impact resistance, of polyolefins include, for example, one comprising first homopolymerizing propylene and subsequently copolymerizing propylene and ethylene to form a block copolymer.

Japanese Patent Laid-open Publication No. 4(1992)-337308 discloses the production of a block copolymer comprising first polymerizing propylene optionally with ethylene in the presence of a specified metallocene compound and an organoaluminum compound to obtain a propylene homopolymer or a propylene copolymer containing less than 6% by weight of ethylene units, and subsequently copolymerizing ethylene and propylene in a weight ratio of 10:90 to 95:5 to obtain an ethylene/propylene copolymer, wherein the homopolymer or copolymer obtained in the first step amounts to 40 to 95% by weight and the copolymer obtained in the second step amounts to 60 to 5% by weight, both being based on the total weight of the finally obtained block polymer. This block copolymer is described as having an excellent balance of impact resistance and rigidity.

Japanese Patent Laid-open Publication No. 5(1993)-202152 discloses a process for producing a polypropylene molding material comprising 20 to 99% by weight of a crystalline polymer having at least 95% by weight of propylene units (1) and 1 to 80% by weight of an amorphous ethylene/propylene copolymer having 20 to 90% by weight of ethylene units (2) in the presence of a catalyst composed of a transition metal compound and an organoaluminum compound, wherein the polymerization for obtaining the amorphous ethylene/propylene copolymer is carried out in the presence of a specified bridge type metallocene compound and aluminoxane. The polypropylene molding material obtained by this process is described as being excellent in, especially, low-temperature impact strength.

Known methods for further enhancing the impact resistance of olefin polymers also include one comprising blending an elastomer with polypropylene. However, due to its poor optical properties such as transparency, the use of such polypropylene having an elastomer blended therein has been limited.

The blending of atactic polypropylene for improving the properties of polypropylene is described in, for example, Japanese Patent Laid-open Publication No. 6(1994)-263934.

In recent years, the requirements on the properties of polyolefins are becoming more severe, and thus the developments of polyolefin compositions having further improved properties and molded articles of such polyolefin compositions are demanded.

The present invention has been made in the above circumstances. Thus, it is an object of the present invention to provide a polyolefin composition which is excellent in mechanical strength, flexibility and transparency, and it is another object of the present invention to provide a molded article of the polyolefin composition.

DISCLOSURE OF THE INVENTION

The polyolefin composition according to the present invention comprises:

45 to 90 parts by weight of a propylene polymer (A),
the above propylene polymer (A):
  having an intrinsic viscosity [$\eta$] of 0.5 to 10 dl/g (i),
  having a temperature (Tm) of at least 100° C. at maximum peak position of an endothermic curve obtained when measured by a differential scanning calorimeter (ii), and
  comprising 100 to 80 mol % of units derived from propylene, 0 to 10 mol % of units derived from ethylene and 0 to 15 mol % of units derived from an α-olefin having 4 to 12 carbon atoms (iii);

5 to 40 parts by weight of an ethylene/α-olefin copolymer (B), the above ethylene/α-olefin copolymer (B):
  having an intrinsic viscosity [$\eta$] of 0.5 to 10 dl/g (i), and
  comprising 70 to 95 mol % of units derived from ethylene and 5 to 30 mol % of units derived from an α-olefin having 4 to 12 carbon atoms (ii); and 2 to 25 parts by weight of a propylene/α-olefin/ethylene terpolymer (C), the above propylene/α-olefin/ethylene terpolymer (C):
  having an intrinsic viscosity [$\eta$] of 0.5 to 10 dl/g (i), and
  comprising 40 to 77 mol % of units derived from propylene, 20 to 40 mol % of units derived from an α-olefin having 4 to 12 carbon atoms and 2 to 20 mol % of units derived from ethylene;
  provided that the total of components (A), (B) and (C) is 100 parts by weight.

This polyolefin composition is excellent in mechanical strength (especially, low-temperature impact resistance), flexibility and transparency.

Besides the above polyolefin composition, the present invention also provides the following embodiments.

In an embodiment of the polyolefin composition, the propylene polymer (A) and ethylene/α-olefin copolymer (B) is replaced by 75 to 95 parts by weight of a propylene block copolymer (A'),
  the above propylene block copolymer (A') comprising:
    60 to 90% by weight of a room temperature n-decane insoluble component (A'-1), the above room temperature n-decane insoluble component (A'-1):
      having an intrinsic viscosity [$\eta$] of 0.5 to 10 dl/g (i),
      having a temperature (Tm) of at least 100° C. at maximum peak position of an endothermic curve obtained when measured by a differential scanning calorimeter (ii), and
      comprising 100 to 80 mol % of units derived from propylene, 0 to 10 mol % of units derived from ethylene and 0 to 15 mol % of units derived from an α-olefin having 4 to 12 carbon atoms (iii); and 40 to 10% by weight of a room temperature n-decane soluble component (A'-2), the above room temperature n-decane soluble component (A'-2):
      having an intrinsic viscosity [$\eta$] of 0.5 to 10 dl/g (i), and
      comprising 60 to 90 mol % of units derived from propylene and 40 to 10 mol % of units derived from ethylene, provided that the total of components (A') and (C) is 100 parts by weight.

In another embodiment of the polyolefin composition, the propylene polymer (A) is replaced by 45 to 90 parts by weight of a propylene block copolymer (A"), the above propylene block copolymer (A") comprising:
60 to 95 parts by weight of a room temperature n-decane insoluble component (A"-1), the above room temperature n-decane insoluble component (A"-1):
having an intrinsic viscosity $[\eta]$ of 0.5 to 10 dl/g (i),
having a temperature (Tm) of at least 100° C. at maximum peak position of an endothermic curve obtained when measured by a differential scanning calorimeter (ii), and
comprising 75 to 100 mol % of units derived from propylene, 10 to 0 mol % of units derived from ethylene and 15 to 0 mol % of units derived from an α-olefin having 4 to 12 carbon atoms (iii); and 40 to 5 parts by weight of a room temperature n-decane soluble component (A"-2), the above room temperature n-decane soluble component (A"-2):
having an intrinsic viscosity $[\eta]$ of 0.5 to 10 dl/g (i), and
comprising 60 to 90 mol % of units derived from propylene and 40 to 10 mol % of units derived from ethylene,
provided that the total of components (A"), (B) and (C) is 100 parts by weight.

In a further embodiment of the polyolefin composition, the propylene polymer (A) is replaced by 45 to 90 parts by weight of a propylene homopolymer or random copolymer (A'''), the above propylene homopolymer or random copolymer (A'''):
having an intrinsic viscosity $[\eta]$ of 0.5 to 10 dl/g (i),
having a temperature (Tm) of at least 100° C. at maximum peak position of an endothermic curve obtained when measured by a differential scanning calorimeter (ii), and
comprising 100 to 75 mol % of units derived from propylene, 0 to 10 mol % of units derived from ethylene and 0 to 15 mol % of units derived from an α-olefin having 4 to 12 carbon atoms (iii),
provided that the total of components (A'''), (B) and (C) is 100 parts by weight.

In a still further embodiment, the polyolefin composition comprises:
50 to 75 parts by weight of the propylene block copolymer (A'), and
more than 25 parts by weight but up to 50 parts by weight of the propylene/α-olefin/ethylene terpolymer (C),
provided that the total of components (A') and (C) is 100 parts by weight.

The molded article of the present invention is formed from any one of the above polyolefin compositions.

The blow molded article of the present invention is also formed from any one of the above polyolefin compositions.

The molded article, for example, blow molded article of the present invention is excellent in mechanical strength (especially, low-temperature impact resistance), flexibility and transparency.

BEST MODE FOR CARRYING OUT THE INVENTION

The polyolefin composition of the present invention comprises a specified propylene polymer (A), ethylene/α-olefin copolymer (B) and propylene/α-olefin/ethylene terpolymer (C). First, these components will be described in detail.

Propylene polymer (A)

The propylene polymer (A) for use in the present invention is as defined below.

(i) The intrinsic viscosity $[\eta]$ thereof ranges from 0.5 to 10 dl/g, preferably, from 1.5 to 3.0 dl/g as measured at 135° C. in decahydronaphthalene.

(ii) The temperature (Tm) at maximum peak position of an endothermic curve obtained when measured by a differential scanning calorimeter (DSC) is at least 100° C., preferably, in the range of 120 to 165° C.

(iii) The propylene polymer comprises:
100 to 80 mol %, preferably, 100 to 85 mol % of units derived from propylene,
0 to 10 mol %, preferably, 0 to 8 mol % of units derived from ethylene, and
0 to 15 mol %, preferably, 0 to 10 mol % of units derived from an α-olefin having 4 to 12 carbon atoms.

Examples of α-olefins having 4 to 12 carbon atoms include 1-butene, 1-pentene, 1-hexene, 4-methyl-1-pentene, 3-methyl-1-pentene, 1-heptene, 1-octene, 1-nonene, 1-decene, 1-dodecene and mixtures thereof. Of these, 1-butene is preferred.

The propylene polymer (A) may be either homopolypropylene or a block copolymer of propylene, ethylene and an α-olefin having 4 to 12 carbon atoms and further may be a propylene random copolymer other than the below described propylene/α-olefin/ethylene terpolymer (C), as long as it has the above-mentioned properties.

When the propylene polymer (A) is a block copolymer, it is preferred to be a propylene block copolymer composed of a crystalline polypropylene component and a random copolymer component.

Further, the propylene polymer (A) may contain a component derived from an olefin other than the above α-olefin in a small amount not detrimental to the object of the present invention, for example, 10 mol % or less.

The crystallinity of the propylene polymer (A) is preferred to range from 40 to 70%, especially, from 45 to 65% and, still especially, from 50 to 60%.

A wide variety of known propylene polymers can be employed in the present invention as long as they have the above-mentioned properties.

A polyolefin composition which is excellent in mechanical strength, flexibility and transparency can be produced from the above propylene polymer (A) together with the following ethylene/α-olefin copolymer (B) and propylene/α-olefin/ethylene terpolymer (C). Moreover, when the temperature Tm of the propylene polymer (A) is within the above range, the resultant polyolefin composition has excellent heat resistance.

In the polyolefin composition of the present invention, the following propylene block copolymer (A') can be used in place of the above propylene polymer (A) and the following ethylene/α-olefin copolymer (B), and the following propylene homopolymer or random copolymer (A") or propylene block copolymer (A''') can be used in place of the above propylene polymer (A).

Propylene block copolymer (A')

The propylene block copolymer (A') for use in the present invention comprises a room temperature n-decane insoluble component (A'-1) and a room temperature n-decane soluble component (A'-2).

In particular, the propylene block copolymer (A') comprises:
60 to 90%, preferably, 70 to 85% by weight of the room temperature n-decane insoluble component (A'-1), and 40 to 10%, preferably, 30 to 15% by weight of the room temperature n-decane soluble component (A'-2).

The room temperature n-decane insoluble component (A'-1) contained in the propylene block copolymer (A') has the following characteristics.

(i) The intrinsic viscosity [η] thereof ranges from 0.5 to 10 dl/g, preferably, from 1.5 to 3.0 dl/g as measured at 135° C. in decahydronaphthalene.

(ii) The temperature (Tm) at maximum peak position of an endothermic curve obtained when measured by a differential scanning calorimeter (DSC) is at least 100° C., preferably, in the range of 120 to 165° C.

(iii) The room temperature n-decane insoluble component comprises:

100 to 80 mol %, preferably, 100 to 85 mol % of units derived from propylene, 0 to 10 mol %, preferably, 0 to 8 mol % of units derived from ethylene, and 0 to 15 mol %, preferably, 0 to 10 mol % of units derived from an α-olefin having 4 to 12 carbon atoms.

Examples of α-olefins having 4 to 12 carbon atoms are those set forth above and mixtures thereof. Of these, 1-butene is preferred.

The room temperature n-decane soluble component (A'-2) contained in the propylene block copolymer (A') has the following characteristics.

(i) The intrinsic viscosity [η] thereof ranges from 0.5 to 10 dl/g, preferably, from 1.0 to 5.0 dl/g as measured at 135° C. in decahydronaphthalene.

(ii) The room temperature n-decane soluble component comprises:

60 to 90 mol %, preferably, 70 to 80 mol % of units derived from propylene, and 40 to 10 mol %, preferably, 30 to 20 mol % of units derived from ethylene.

The melt flow rate (NFR, measured at 230° C. under a load of 2.16 kg in accordance with ASTM D1238) of the propylene block copolymer (A') composed of the above room temperature n-decane insoluble component (A'-1) and room temperature n-decane soluble component (A'-2) ranges from 0.1 to 200 g/10 min, preferably, from 0.5 to 15 g/10 min.

Further, the propylene block copolymer (A') may contain component units derived from an olefin other than the above α-olefin in a small amount not detrimental to the object of the present invention, for example, 10 mol % or less.

A wide variety of known propylene block copolymers can be employed in the present invention as long as they have the above-mentioned properties.

A polyolefin composition which is excellent in mechanical strength, flexibility and transparency can be produced from the above propylene block copolymer (A') together with the following propylene/α-olefin/ethylene terpolymer (C). Moreover, when the temperature Tm of the propylene block copolymer (A') is within the above range, the resultant polyolefin composition has excellent heat resistance.

Propylene block copolymer (A")

The propylene block copolymer (A") for use in the present invention comprises a room temperature n-decane insoluble component (A"-1) and a room temperature n-decane soluble component (A"-2).

In particular, the propylene block copolymer (A") comprises:

60 to 95%, preferably, 70 to 90% by weight of the room temperature n-decane insoluble component (A"-1), and 40 to 5%, preferably, 30 to 10% by weight of the room temperature n-decane soluble component (A"-2).

The room temperature n-decane insoluble component (A"-1) contained in the propylene block copolymer (A") has the following characteristics.

(i) The intrinsic viscosity [η] thereof ranges from 0.5 to 10 dl/g, preferably, from 1.5 to 3.0 dl/g as measured at 135° C. in decahydronaphthalene.

(ii) The temperature (Tm) at maximum peak position of an endothermic curve obtained when measured by a differential scanning calorimeter (DSC) is at least 100° C., preferably, in the range of 120 to 165° C.

(iii) The room temperature n-decane insoluble component comprises:

75 to 100 mol %, preferably, 85 to 100 mol % of units derived from propylene, 10 to 0 mol %, preferably, 6 to 0 mol % of units derived from ethylene, and 15 to 0 mol %, preferably, 10 to 0 mol % of units derived from an α-olefin having 4 to 12 carbon atoms.

Examples of α-olefins having 4 to 12 carbon atoms are those set forth above and mixtures thereof. Of these, 1-butene is preferred.

The room temperature n-decane soluble component (A"-2) contained in the propylene block copolymer (A") has the following characteristics.

(i) The intrinsic viscosity [η] thereof ranges from 0.5 to 10 dl/g, preferably, from 1.0 to 5.0 dl/g as measured at 135° C. in decahydronaphthalene.

(ii) The room temperature n-decane soluble component comprises:

60 to 90 mol %, preferably, 70 to 85 mol % of units derived from propylene, and 40 to 10 mol %, preferably, 30 to 15 mol % of units derived from ethylene.

The melt flow rate (MFR, measured at 230° C. under a load of 2.16 kg in accordance with ASTM D1238) of the propylene block copolymer (A") composed of the above room temperature n-decane insoluble component (A"-1) and room temperature n-decane soluble component (A"-2) generally ranges from 0.1 to 200 g/10 min, preferably, from 0.5 to 15 g/10 min.

Further, the propylene block copolymer (A") may contain component units derived from an olefin other than the above α-olefin in a small amount not detrimental to the object of the present invention, for example, 10 mol % or less.

A wide variety of known propylene block copolymers can be employed in the present invention as long as they have the above-mentioned properties.

A polyolefin composition which is excellent in mechanical strength, flexibility and transparency can be produced from the above propylene block copolymer (A") together with the following ethylene/α-olefin copolymer (B) and propylene/α-olefin/ethylene terpolymer (C). Moreover, when the temperature Tm of the propylene block copolymer (A") is within the above range, the resultant polyolefin composition has excellent heat resistance.

Propylene polymer (A''')

A propylene homopolymer or propylene random copolymer having the following characteristics is used as the propylene polymer (A''') in the present invention.

(i) The intrinsic viscosity [η] thereof ranges from 0.5 to 10 dl/g, preferably, from 1.5 to 3.0 dl/g as measured at 135° C. in decahydronaphthalene.

(ii) The temperature (Tm) at maximum peak position of an endothermic curve obtained when measured by a differential scanning calorimeter (DSC) is at least 100° C., preferably, in the range of 120 to 165° C.

(iii) The propylene polymer comprises:

100 to 80 mol %, preferably, 100 to 85 mol % of units derived from propylene, 0 to 10 mol %, preferably, 0 to 8 mol % of units derived from ethylene, and 0 to 15 mol %, preferably, 0 to 10 mol % of units derived from an α-olefin having 4 to 12 carbon atoms.

Examples of α-olefins having 4 to 12 carbon atoms are those set forth above and mixtures thereof. Of these, 1-butene is preferred.

The propylene polymer (A''') may be either homopolypropylene or a random copolymer of propylene, ethylene and an α-olefin having 4 to 12 carbon atoms and further may be a propylene random copolymer other than the below described propylene/α-olefin/ethylene terpolymer (C), as long as it has the above-mentioned properties.

Further, the propylene polymer (A''') may contain a component derived from an olefin other than the above α-olefin in a small amount not detrimental to the object of the present invention, for example, 10 mol % or less.

The crystallinity of the propylene polymer (A''') is preferred to range from 40 to 70%, especially, from 45 to 65% and, still especially, from 50 to 60%.

A wide variety of known propylene polymers can be employed in the present invention as long as they have the above-mentioned properties.

A polyolefin composition which is excellent in mechanical strength, flexibility and transparency can be produced from the propylene polymer (A''') having the above melting point together with the following ethylene/α-olefin copolymer (B) and propylene/α-olefin/ethylene terpolymer (C). Moreover, when the temperature Tm of the propylene polymer (A''') is within the above range, the resultant polyolefin composition has excellent heat resistance.

Ethylene/α-olefin copolymer (B)

The ethylene/α-olefin copolymer (B) for use in the present invention is characterized by:

having an intrinsic viscosity [η] of 0.5 to 10 dl/g, preferably, 1.0 to 5.0 dl/g as measured at 135° C. in decahydronaphthalene (i), and comprising 70 to 95 mol %, preferably, 80 to 92 mol % of units derived from ethylene and 30 to 5 mol %, preferably, 20 to 8 mol % of units derived from an α-olefin having 4 to 12 carbon atoms (ii).

Examples of α-olefins having 4 to 12 carbon atoms include 1-butene, 1-pentene, 1-hexene, 1-heptene, 1-octene, 1-decene, 1-dodecene, 4-methyl-1-pentene and mixtures thereof. Of these, α-olefins having 4 to 8 carbon atoms are preferred, and 1-butene, 1-hexene and 1-octene are especially preferred.

In addition to the units derived from ethylene and units derived from the above α-olefin, the ethylene/α-olefin copolymer (B) may comprise units derived from the above α-olefin but also units derived from other olefins and polyenes, if necessary. Specifically, the ethylene/α-olefin copolymer (B) may contain units derived from, for example, a vinyl compound such as styrene, vinylcyclopentene, vinylcyclohexane or vinylnorbornane, a vinyl ester such as vinyl acetate, an unsaturated organic acid such as maleic anhydride or its derivative, or a polyene such as a conjugated diene and a nonconjugated diene such as dicyclopentadiene, 1,4-hexadiene, dicyclooctadiene, methylenenorbornene or 5-ethylidene-2-norbornene.

The ethylene/α-olefin copolymer (B) may be either a random copolymer of ethylene and an α-olefin or a block copolymer thereof.

Of the above ethylene/α-olefin copolymers (B), ethylene/α-olefin random copolymers are preferred, and the use of ethylene/1-butene, ethylene/1-hexene and ethylene/1-octene random copolymers is especially preferred.

The polyolefin composition of the present invention may contain at least two types of ethylene/α-olefin copolymers (B) described above.

A wide variety of known ethylene/α-olefin copolymers can be employed in the present invention as long as they have the above-mentioned properties.

Propylene/α-olefin/ethylene terpolymer (C)

The propylene/α-olefin/ethylene terpolymer (C) for use in the present invention is characterized by:

having an intrinsic viscosity [η] of 0.5 to 10 dl/g, preferably, 1.0 to 5.0 dl/g as measured at 135° C. in decahydronaphthalene (i), and comprising 30 to 80 mol %, preferably, 40 to 77 mol % and, still preferably, 50 to 71 mol % of units derived from propylene, 40 to 15 mol %, preferably, 40 to 20 mol % and, still preferably, 35 to 25 mol % of units derived from an α-olefin, and 20 to 2 mol %, preferably, 15 to 4 mol % of units derived from ethylene (ii).

Examples of α-olefins having 4 to 12 carbon atoms include 1-butene, 1-pentene, 1-hexene, 4-methyl-1-pentene and 1-octene. Of these, 1-butene is preferred.

The propylene/α-olefin/ethylene terpolymer (C) may contain component units derived from an olefin other than propylene, α-olefin and ethylene in a small amount, for example, 10 mol % or less.

A wide variety of known propylene/α-olefin/ethylene terpolymers can be employed in the present invention as long as they have the above-mentioned properties.

The above propylene polymer (A), propylene block copolymer (A'), propylene block copolymer (A''), propylene polymer (A'''), ethylene/α-olefin copolymer (B) and propylene/α-olefin/ethylene terpolymer (C) for use in the present invention can be produced with the use of, for example, a conventional Ziegler catalyst such as a solid titanium catalyst, a metallocene catalyst containing a metallocene compound of a transition metal such as zirconium or a vanadium catalyst while appropriately selecting the type and amount of monomer and the catalyst fed into each polymerization system.

For example, a solid titanium catalyst comprising a solid titanium catalyst component and an organometallic compound catalyst component optionally together with an electron donor can be used as the catalyst.

The solid titanium catalyst component may be, for example, one comprising a support having a specific surface area of at least 100 $m^2/g$ and titanium trichloride or a titanium trichloride composition carried thereon, and another comprising, as essential components, magnesium, a halogen, an electron donor (preferably, an aromatic carboxylic ester, an alkyl containing ether or the like) and titanium. Of these, the latter solid titanium catalyst component is preferred.

The organometallic compound catalyst component may be, for example, an organoaluminum compound such as a trialkylaluminum, a dialkylaluminum halide, an alkylaluminum sesquihalide or an alkylaluminum dihalide. The type of organoaluminum compound can be selected in accordance with the type of titanium catalyst component employed.

The electron donor may be, for example, an organic compound containing a nitrogen atom, a phosphorus atom, a sulfur atom, a silicon atom, a boron atom or the like. An ester or ether compound containing the above atom is preferred.

These catalyst may be activated by copulverization or other means, and an olefin may be prepolymerized.

Polyolefin composition

The polyolefin composition of the present invention comprises:

45 to 90 parts by weight, preferably, 55 to 85 parts by weight of the propylene polymer (A), 5 to 40 parts by weight, preferably, 10 to 30 parts by weight of the ethylene/α-olefin copolymer (B), and 2 to 25 parts by weight, preferably, 5 to 15 parts by weight of the above propylene/α-olefin/ethylene terpolymer (C), provided that the total of components (A), (B) and (C) is 100 parts by weight.

The polyolefin composition of the present invention includes various embodiments in which in place of the propylene polymer (A), the propylene block copolymer (A'), propylene block copolymer (A") or propylene homopolymer or propylene random copolymer (A''') as specified above is used.

When use is made of the propylene block copolymer (A'), it is not always necessary to add the ethylene/α-olefin copolymer (B). In this case, the polyolefin composition comprises 75 to 95 parts by weight, preferably, 80 to 90 parts by weight of the propylene polymer (A') and 25 to 50 parts by weight, preferably, 30 to 40 parts by weight of the propylene/α-olefin/ethylene terpolymer (C), provided that the total of components (A') and (C) is 100 parts by weight.

When use is made of the propylene block copolymer (A"), the polyolefin composition comprises 45 to 90 parts by weight, preferably, 55 to 85 parts by weight of the propylene block copolymer (A"), 5 to 40 parts by weight, preferably, 10 to 30 parts by weight of the ethylene/α-olefin copolymer (B), and 2 to 25 parts by weight, preferably, 5 to 15 parts by weight of the propylene/α-olefin/ethylene terpolymer (C), provided that the total of components (A"), (B) and (C) is 100 parts by weight.

When use is made of the propylene homopolymer or propylene random copolymer (A'''), the polyolefin composition comprises 45 to 90 parts by weight, preferably, 55 to 85 parts by weight of the propylene homopolymer or propylene random copolymer (A'''), 5 to 40 parts by weight, preferably, 10 to 33 parts by weight of the ethylene/α-olefin copolymer (B), and 2 to 25 parts by weight, preferably, 5 to 15 parts by weight of the propylene/α-olefin/ethylene terpolymer (C), provided that the total of components (A'''), (B) and (C) is 100 parts by weight.

In a further embodiment, the polyolefin composition of the present invention comprises:

50 to 75 parts by weight, preferably, 55 to 70 parts by weight of the propylene block copolymer (A'), and more than 25 parts by weight but up to 50 parts by weight, preferably, 30 to 45 parts by weight of the propylene/α-olefin/ethylene terpolymer (C), provided that the total of components (A') and (C) is 100 parts by weight.

The polyolefin composition of the present invention can be produced by blending together the propylene polymer (A), ethylene/α-olefin copolymer (B) and propylene/butene/ethylene terpolymer (C) according to the customary blending techniques, wherein the propylene polymer (A) and, optionally, the ethylene/α-olefin copolymer (B) may be replaced by the propylene block copolymer (A'), propylene block copolymer (A") or propylene homopolymer or propylene random copolymer (A'''). This blending is preferably conducted by melt kneading the above components with the use of, for example, a twin-screw extruder.

The melt flow rate (MFR, measured at 190° C. under a load of 2.16 kg in accordance with ASTM D1238-65T) of the thus obtained polyolefin composition of the present invention generally ranges from 0.1 to 200 g/10 min, preferably, from 0.5 to 15 g/10 min.

The polyolefin composition of the present invention may contain, in an amount not detrimental to the object of the present invention, various additives such as other resin components, antioxidants, ultraviolet absorbers, lubricants, nucleating agents, antistatic agents, flame retarders, pigments, dyes, inorganic fillers and organic fillers.

Although the polyolefin composition of the present invention can be used without any particular restriction in fields in which conventional polyolefins have been employed, it is especially suitable for use for e.g. extruded sheets, unoriented films, oriented films, filaments, injection molded articles, and blow molded articles.

Although the morphology or product line of the extrudate of the polyolefin composition of the present invention is not particularly limited, the polyolefin composition may be extrusion molded into, for example, sheets, unoriented films, pipes, hoses, wire coverings or filaments. In the production of extrudates such as sheets or unoriented films from the polyolefin composition of the present invention, conventional extruders can be used. For example, the polyolefin composition can be molten in a single screw extruder, a kneading extruder or a ram extruder or a gear extruder and then extruded through a T die to produce desired extrudates. Conventionally known molding conditions can be employed. The thus obtained extruded sheets and unoriented films are excellent in not only flexibility and impact resistance but also transparency.

The oriented film can be produced from the above sheet or film of the polyolefin composition by means of a commonly employed orienting device. For example, the tenter method (lengthwise/crosswise orientation, crosswise/lengthwise orientation), simultaneous biaxial orientation method or uniaxial orientation method can be utilized. The draw ratio of the biaxially oriented film is preferred to be generally in the range of 20 to 70 and the draw ratio of the uniaxially oriented film is preferred to be generally in the range of 2 to 10. The thickness of the oriented film is preferred to be generally in the range of 5 to 200 μm. The thus obtained oriented film is excellent in not only impact resistance but also transparency.

Moreover, an inflation film can be produced from the polyolefin composition of the present invention.

The sheet, unoriented film and oriented film of the polyolefin composition of the present invention are so excellent in impact resistance and transparency that they find wide applications, for example, as packaging films. Further, they have especially excellent moistureproofing properties, so that they are suitable for use as press through packages which are employed in packaging medicinal tablets, capsules and the like.

The filament of the polyolefin composition of the present invention can be produced, for example, by extruding the molten polyolefin composition through a spinning nozzle. The thus obtained filament may further be subjected to orientation. This orientation is desirably made to a degree such that the polyolefin is effectively endowed with at least a uniaxial molecular orientation, and the draw ratio thereof is preferred to be generally in the range of 5 to 10. The thus obtained filament is excellent in flexibility and heat resistance.

The injection molded article of the polyolefin composition of the present invention can be produced by means of a commonly employed injection molding machine. Conventionally known molding conditions can be employed. The thus obtained injection molded article is so excellent in impact resistance, etc. that it can find wide applications in, for example, automobile interior trims, automobile exterior trims, housings of household electric appliance and containers.

The blow molded article of the polyolefin composition of the present invention can be produced by means of a commonly employed blow molding machine. Conventionally known molding conditions can be employed. For example, the extrusion blow molding comprises extruding the polyolefin composition in the molten state at a resin temperature of 100 to 300° C. through a die into a tubular parison, holding the parison in a mold having a morphology with which the parison is to be endowed and blowing thereinto air at a resin temperature of 130 to 300° C. so that the parison is fitted in the mold, thereby obtaining a hollow molded article. The draw ratio thereof is preferred to range from 1.5 to 5 in the crosswise direction. On the other hand, the injection blow molding comprises injecting the polyolefin composition at a resin temperature of 100 to 300° C. into a mold to form a parison, holding the parison in a mold having a morphology with which the parison is to be endowed and blowing thereto air at a resin temperature of 120 to 300° C. so that the parison is fitted in the mold, thereby obtaining a hollow molded article. The draw ratio thereof is preferred to range from 1.1 to 1.8 in the lengthwise direction and to range from 1.3 to 2.5 in the crosswise direction. The thus obtained blow molded article is excellent in not only rigidity and impact resistance but also transparency. Further, the polyolefin composition has excellent flexibility and impact resistance despite that the content of amorphous or low crystalline components is relatively small. The blow molded article of such polyolefin composition has high buckling strength.

According to the present invention, a polyolefin composition whose press molded specimen exhibits a flexural modulus of not greater than 700 MPa, preferably, 200 to 500 MPa can be provided. Further, a blow molded article whose haze value is not greater than 30%, preferably, in the range of 25 to 5% can also be provided.

When the flexural modulus is greater than 700 MPa, the flexibility is likely to be insufficient. On the other hand, when the flexural modulus is lower than 200 MPa, the buckling strength may be insufficient and shape retention properties may be lacking.

EFFECT OF THE INVENTION

The polyolefin composition of the present invention is excellent in not only flexibility, transparency and mechanical strength but also heat resistance and does not suffer from serious deterioration of these properties even when exposed to high temperatures. This polyolefin composition of the present invention can suitably be used as packaging articles, especially, medical blow bottles which are sterilized at high temperatures (e.g., 100° C. or higher).

The molded article such as blow molded article of the present invention has excellent mechanical strength and transparency.

EXAMPLE

The present invention will be further illustrated below with reference to the following Examples, which in no way limit the scope of the invention.

In the following Examples, the polymer makeup and properties were measured by the following methods.
(1) Melt flow rate (MFR):
measured at 230° C. under a load of 2.16 kg in accordance with ASTM D1238-65T.
(2) Polymer makeup:
determined by $^{13}$C-NMR spectroscopy in which a sample consisting of about 200 mg of polymer homogeneously dissolved in 1 ml of hexachlorobutadiene in a sample tube of 10 mm in diameter was analyzed at a measuring temperature of 120° C., a measuring frequency of 25.02 MHz, a spectral width of 1500 Hz, a pulse cycling time of 4.2 sec and a pulse width of 6 μsec.
(3) Intrinsic viscosity [η]:
measured at 135° C. in decahydronaphthalene.
(4) Flexural test (flexural modulus (FM)):
An FM specimen punched from a sheet of 2 mm in thickness pressed at 200° C. was tested at 23° C., a span of 32 mm and a flex speed of 5 mm/min in accordance with ASTM D790.
(5) Izod impact strength (IZ):
measured at −10° C. in accordance with ASTM D256.
(6) Haze:
A specimen was cut out from the cylindrical part of a bottle molded at 200° C. and the haze thereof was measured in accordance with ASTM D1003. In and after Example 6, the measurement was conducted of a sheet of 0.5 mm in thickness pressed at 200° C.
(7) Room temperature n-decane fractionation:
About 2 g of a sample was accurately weighed, placed in about 500 ml of n-decane in a thermostatic glass vessel of the double pipe type and the mixture was agitated at 140° C. for about 1 hr to completely dissolve the sample in the n-decane. Then, the temperature of the solution was slowly lowered under agitation to room temperature. The agitation was continued overnight after the temperature of the solution became constant, and any powdery n-decane insoluble was separated by a glass filter. The filtrate was put in excess acetone and any precipitated n-decane soluble was separated by a glass filter. The powdery n-decane insoluble was completely dissolved in about 500 ml of n-decane at about 140° C., re-precipitated in excess acetone and separated by filtration. The thus fractionated n-decane insoluble and n-decane soluble were separately dried in vacuum overnight in a vacuum dryer at about 80° C. and accurately weighed.

Production Example 1

Production of propylene polymer (A)-1
[Preparation of titanium catalyst component (1)]

7.14 g (75 mmol) of anhydrous magnesium chloride, 37.5 ml of decane and 35.1 ml (225 mmol) of 2-ethylhexyl alcohol were heated at 130° C. for 2 hr to obtain a homogeneous solution. 1.67 g (11.3 mmol) of phthalic anhydride was added to this solution and the mixture was agitated at 130° C. for further 1 hr to dissolve the phthalic anhydride in the homogeneous solution.

The thus obtained homogeneous solution was cooled to room temperature and the whole amount thereof was added dropwise to 200 ml (1.8 mol) of titanium tetrachloride held at −20° C. over a period of 1 hr. After the completion of the addition, the temperature of the liquid mixture was raised to 110° C. over a period of 4 hr and, upon reaching 110° C., 5.03 ml (18.8 mmol) of diisobutyl phthalate was added. The same temperature was maintained under agitation for 2 hr. After the completion of the 2-hr reaction, a solid was collected by hot filtration, re-suspended in 275 ml of TiCl$_4$ and the suspension was again heated at 110° C. for 2 hr.

After the completion of the reaction, the solid was again collected by hot filtration and satisfactorily washed with decane at 110° C. and hexane until any free titanium compound was no longer detected in the washings. The thus prepared titanium catalyst component (1) was stored in the form of a hexane slurry. An aliquot thereof was dried and the catalyst makeup was examined. It contained 2.5% by weight of titanium, 58% by weight of chlorine, 18% by weight of magnesium and 13.8% by weight of diisobutyl phthalate.

[Prepolymerization]

200 ml of purified hexane, 20 mmol of triethylaluminum, 4 mmol of dicyclopentyldimethoxysilane and 2 mmol, in terms of titanium atom, of the above obtained titanium catalyst component (1) were charged in a 400 ml glass vessel purged with nitrogen. Thereafter, propylene was fed into the mixture at a rate of 5.9 N-lit./hr for 1 hr to polymerize 2.8 g of propylene per g of the titanium catalyst component (1).

[Polymerization]

3 kg of propylene, 30 lit. of ethylene and 8 lit. of hydrogen were charged in an autoclave having an internal volume of 17 lit. and heated to 50° C. Then, 15 mmol of triethylaluminum, 5 mmol of cyclohexylmethyldimethoxysilane and 0.05 mmol, in terms of titanium atom, of the prepolymerized catalyst obtained above were charged. The mixture was heated to 70° C. and polymerization was effected for 40 min while maintaining this temperature.

Thereafter, a vent valve was opened and unreacted propylene was expelled through an integrating flow meter.

Subsequently, 240 lit./hr of ethylene, 960 lit./hr of propylene and 15 lit./hr of hydrogen were fed into the polymerizer and polymerization was executed at 70° C. for 60 min while adjusting the degree of opening of the vent of the polymerizer so that the internal pressure of the polymerization system was held at 10 kg/cm$^2$-G. A small amount of ethanol was added to terminate the polymerization reaction, and any unreacted gas was expelled from the autoclave.

As a result, 2781 g of polypropylene (propylene block copolymer (A)) as specified in Table 1 was obtained. This polypropylene contained 20% by weight of decane soluble component whose intrinsic viscosity [η] was 1.8 dl/g and which had an ethylene content of 25 mol % and an MFR of 4.5 g/10 min.

TABLE 1

|  |  | propylene block copolymer (A)-1 room temp. n-decane insoluble | room temp. n-decane soluble |
|---|---|---|---|
| makeup | [η] (dl/g) | 2.0 | 1.8 |
|  | Tm (°C.) | 142 | — |
|  | propylene content (mol %) | 95.9 | 75 |
|  | ethylene content (mol %) | 4.1 | 25 |
|  | amt. (wt. %) | 80 | 20 |

Production Example 2

Production of propylene/butene/ethylene terpolymer (C)-1

[Preparation of titanium catalyst component (2)]

4.76 g (50 mmol) of anhydrous magnesium chloride, 25 ml of decane and 23.4 ml (150 mmol) of 2-ethylhexyl alcohol were heated at 130° C. for 2 hr to obtain a homogeneous solution. 1.11 g (7.5 mmol) of phthalic anhydride was added to this solution and the mixture was agitated at 130° C. for further 1 hr to dissolve the phthalic anhydride in the homogeneous solution.

The thus obtained homogeneous solution was cooled to room temperature and the whole amount thereof was added, dropwise to 200 ml (1.8 mol) of titanium tetrachloride held at −20° C. over a period of 1 hr. After the completion of the addition, the temperature of the liquid mixture was raised to 110° C. over a period of 4 hr and, upon reaching 110° C., 2.68 ml (12.5 mmol) of diisobutyl phthalate was added. The same temperature was maintained under agitation for 2 hr. After the completion of the 2-hr reaction, a solid was collected by hot filtration, re-suspended in 200 ml of TiCl$_4$ and the suspension was again heated at 110° C. for 2 hr. After the completion of the reaction, the solid was again collected by hot filtration and satisfactorily washed with decane at 110° C. and hexane until any free titanium compound was no longer detected in the washings. The thus prepared titanium catalyst component (2) was stored in the form of a hexane slurry. An aliquot thereof was dried and the catalyst makeup was examined.

The thus obtained titanium catalyst component (2) contained 3.1% by weight of titanium, 56.0% by weight of chlorine, 17.0% by weight of magnesium and 20.9% by weight of diisobutyl phthalate.

[Polymerization]

250 ml of n-decane, 1.25 mmol of triisobutylaluminum, 0.15 mmol of diphenyldimethoxysilane and 0.025 mmol, in terms of titanium atom, of the above obtained titanium catalyst component (2) were charged in a 500 ml flask and heated to 70° C. Thereafter, 10 lit./hr of ethylene, 70 lit./hr of propylene, 50 lit./hr of 1-butene and 10 lit./hr of hydrogen were continuously fed into the mixture under atmospheric pressure, and polymerization was executed at 70° C. for 30 min. The polymerization progressed in the state of a solution. Isobutyl alcohol was added to terminate the polymerization reaction and poured into a large volume of methanol to precipitate the whole amount of polymer which was dried at 120° C. overnight in vacuum.

As a result, 13 g of propylene/butene/ethylene terpolymer (C)-1 as specified in Table 2 was obtained.

Production Example 3

Production of propylene/butene/ethylene terpolymer (C)-2

Propylene/butene/ethylene terpolymer (C)-2 as specified in Table 2 was produced in an analogous manner as in Production Example 2.

TABLE 2

|  |  | propylene/butene/ethylene terpolymer | |
|---|---|---|---|
|  |  | (C)-1 | (C)-2 |
| makeup | [η] (dl/g) | 2.1 | 2.0 |
|  | propylene content (mol %) | 59.2 | 62.0 |
|  | 1-butene content (mol %) | 29.5 | 31.5 |
|  | ethylene content (mol %) | 11.3 | 6.5 |

EXAMPLE 1

0.2 part by weight of tetrakis[methylene-3(3,5-di-t-butyl-4-hydroxyphenyl)propionate]methane and 0.1 part by weight of calcium stearate were added to a mixture of 70 parts by weight of the propylene block copolymer (A)-1 obtained in Production Example 1, 20 parts by weight of the ethylene/1-butene copolymer (B)-1 specified in Table 3 and 10 parts by weight of the propylene/1-butene/ethylene terpolymer (C)-1 obtained in Production Example 2 and the mixture was melt kneaded at 200° C. by means of a 20 mm diameter twin-screw extruder, thereby obtaining a polyolefin composition.

The obtained polyolefin composition was press molded at a molding temperature of 200° C. to prepare test specimens, for which the flexural modulus (FM) and Izod impact strength (IZ) at −10° C. were measured. Further, the polyolefin composition was molded by means of a blow molding machine at a molding temperature of 200° C. into a blown bottle of 150 ml in internal volume The haze of the bottle was measured. The results are given in Table 4.

TABLE 3

|  |  | ethylene/α-olefin copolymer | | |
|---|---|---|---|---|
|  |  | (B)-1 | (B)-2 | (B)-3 |
| makeup | [η] (dl/g) | 1.4 | 1.0 | 1.5 |
|  | ethylene content (mol %) | 88 | 92 | 89 |
|  | α-olefin content (mol %) | 12 (1-butene) | 8 (1-hexene) | 11 (1-octene) |

EXAMPLE 2

A polyolefin composition was produced in the same manner as in Example 1, except that the weight ratio of each resin was changed as indicated in Table 4. Test specimens were prepared from the obtained polyolefin composition and the properties thereof were measured in the same manner as in Example 1. The results are given in Table 4.

EXAMPLE 3

A polyolefin composition was produced in the same manner as in Example 1, except that the propylene/1-butene/ethylene terpolymer (C)-2 produced in Production Example 3 was used as the propylene/1-butene/ethylene terpolymer and that the weight ratio of each resin was changed as indicated in Table 4. Test specimens were prepared from the obtained polyolefin composition and the properties thereof were measured in the same manner as in Example 1. The results are given in Table 4.

EXAMPLE 4

A polyolefin composition was produced in the same manner as in Example 1, except that the ethylene/1-hexene copolymer (B)-2 specified in Table 3 was used as the ethylene/α-olefin copolymer and that the weight ratio of each resin was changed as indicated in Table 4. Test specimens were prepared from the obtained polyolefin composition and the properties thereof were measured in the same manner as in Example 1. The results are given in Table 4.

EXAMPLE 5

A polyolefin composition was produced in the same manner as in Example 1, except that the ethylene/1-octene copolymer (B)-3 specified in Table 3 was used as the ethylene/α-olefin copolymer and that the weight ratio of each resin was changed as indicated in Table 4. Test specimens were prepared from the obtained polyolefin composition and the properties thereof were measured in the same manner as in Example 1. The results are given in Table 4.

TABLE 4

|  | Example 1 | Example 2 | Example 3 | Example 4 | Example 5 |
|---|---|---|---|---|---|
| type of component (A) | (A)-1 | (A)-1 | (A)-1 | (A)-1 | (A)-1 |
| type of component (B) | (B)-1 | (B)-1 | (B)-1 | (B)-2 | (B)-3 |
| type of component (C) | (C)-1 | (C)-1 | (C)-2 | (C)-1 | (C)-1 |
| wt. ratio (A)/(B)/(C) | 70/20/10 | 70/15/15 | 75/15/10 | 75/15/10 | 75/15/10 |
| MFR (g/10 min) | 4.2 | 4.1 | 4.2 | 4.5 | 4.2 |
| FM (MPa) | 294 | 255 | 344 | 299 | 290 |
| −10° C. IZ (J/m) | NB*1 | NB | NB | NB | NB |
| haze of bottle (%) | 21 | 18 | 17 | 20 | 19 |

*1: NB = not broken

EXAMPLES 6 TO 10

The propylene polymer (A)-1 obtained in Production Example 1 and each of the propylene/α-olefin/ethylene terpolymers (C) obtained in Production Examples 2 and 3 were blended together in a varied ratio indicated in Table 5, thereby obtaining polyolefin compositions of the present invention. The properties of the obtained polyolefin compositions are given in Table 5.

The blending of the propylene polymer (A)-1 and each of the propylene/α-olefin/ethylene terpolymers (C) was effected by melt kneading with the use of Harke twin-screw extruder at a resin temperature of 200° C.

TABLE 5

|  | Example 6 | Example 7 | Example 8 | Example 9 | Example 10 |
|---|---|---|---|---|---|
| type of component (A) | (A)-1 | (A)-1 | (A)-1 | (A)-1 | (A)-1 |
| type of component (C) | (C)-1 | (C)-1 | (C)-1 | (C)-2 | (C)-2 |
| wt. ratio (A)/(C) | 90/10 | 80/20 | 70/30 | 90/10 | 80/20 |
| MFR (g/10 min) | 5.2 | 4.3 | 4.3 | 4.8 | 4.7 |
| flexural modulus (MPa) | 442 | 324 | 216 | 491 | 422 |
| haze (%) | 35 | 30 | 24 | 34 | 30 |

Production Example 4

Production of propylene Polymer (A)-2
[Prepolymerization]

200 ml of purified hexane, 20 mmol of triethylaluminum, 4 mmol of dicyclopentyldimethoxysilane and 2 mmol, in terms of titanium atom, of the titanium catalyst component (1) obtained in Production Example 1 were charged in a 400 ml glass reactor purged with nitrogen. Thereafter, propylene was fed into the mixture at a rate of 5.9 N-lit./hr for 1 hr to polymerize 2.8 g of propylene per g of the titanium catalyst component (1).

After the completion of the prepolymerization, the liquid phase was filtered off and an isolated solid was redispersed in decane.

[Main polymerization]

A mixture of 750 ml of hexane, 0.75 mmol of triethylaluminum, 0.75 mmol of cyclohexylmethyldimethoxysilane and 0.015 mmol, in terms of titanium atom, of the above prepolymerized titanium catalyst component (1) was charged in a stainless steel autoclave of 2 lit. in internal volume thoroughly purged with nitrogen. Thereafter, 150 ml of hydrogen was introduced and, the feeding of a gaseous mixture of propylene/ethylene/1-butene (90.7/5.3/4.0 mol %) was started. Polymerization was executed at 60° C. for 1.5 hr while maintaining the total pressure at 2 kg/cm$^2$-G.

After the completion of the polymerization, the polymer was separated by filtration and dried at 80° C. overnight in vacuum. As a result, 125 g of propylene polymer (A)-2 was obtained, which contained 3.2 mol % of ethylene units, 95.2 mol % of propylene units and 1.6 mol % of 1-butene units and which had an intrinsic viscosity [η] 20 of 1.9 dl/g and a Tm of 138° C.

EXAMPLES 11 TO 14

The propylene polymer (A)-2 obtained in Production Example 4, each of the ethylene/α-olefin copolymers (B) specified in Table 3 and each of the propylene/butene/ethylene terpolymers (C) obtained in Production Examples 2 and 3 were blended together in a varied ratio indicated in Table 6, thereby obtaining polyolefin compositions of the present invention. The blending of the above components was effected by a melt kneading with the use of Harke twin-screw extruder at a resin temperature of 200° C. The properties of the obtained polyolefin compositions are given in Table 6.

TABLE 6

|  | Example 11 | Example 12 | Example 13 | Example 14 |
|---|---|---|---|---|
| type of component (A) | (A)-2 | (A)-2 | (A)-2 | (A)-2 |
| type of component (B) | (B)-1 | (B)-1 | (B)-2 | (B)-3 |
| type of component (C) | (C)-1 | (C)-1 | (C)-2 | (C)-2 |
| wt. ratio (A)/(B)/(C) | 60/30/10 | 60/20/20 | 60/30/10 | 60/30/10 |
| MFR (g/10 min) | 6.1 | 7.0 | 9.8 | 6.3 |
| flexural modulus (MPa) | 333 | 320 | 328 | 318 |
| −10° C. IZ (J/m) | 52 | 35 | 51 | 97 |
| Haze (%) | 22 | 23 | 27 | 17 |

We claim:

1. A polyolefin composition comprising:

45 to 90 parts by weight of a propylene polymer (A), said propylene polymer (A):

having an intrinsic viscosity η of 0.5 to 10 dl/g (i), having a temperature (Tm) of at least 100° C. at maximum peak position of an endothermic curve obtained when measured by a differential scanning calorimeter (ii), and comprising 100 to 80 mol % of units derived from propylene, 0 to 10 mol % of units derived from ethylene and 0 to 15 mol % of units derived from an α-olefin having 4 to 12 carbon atoms (iii);

5 to 40 parts by weight of an ethylene/α-olefin copolymer (B), said ethylene/α-olefin copolymer (B):

having an intrinsic viscosity η of 0.5 to 10 dl/g (i), and comprising 70 to 95 mol % of units derived from ethylene and 5 to 30 mol % of units derived from an α-olefin having 4 to 12 carbon atoms (ii); and 2 to 25 parts by weight of a propylene/α-olefin/ethylene terpolymer (C), said propylene/α-olefin/ethylene terpolymer (C):

having an intrinsic viscosity η of 0.5 to 10 dl/g (i), and comprising 40 to 77 mol % of units derived from propylene, 20 to 40 mol % of units derived from an α-olefin having 4 to 12 carbon atoms and 2 to 20 mol % of units derived from ethylene;

provided that the total of components (A), (B) and (C) is 100 parts by weight.

2. A polyolefin composition comprising:

75 to 95 parts by weight of a propylene block copolymer (A'), said propylene block copolymer (A') comprising: 60 to 90% by weight of a room temperature n-decane insoluble component (A'-1), said room temperature n-decane insoluble component (A'-1).

having an intrinsic viscosity η of 0.5 to 10 dl/g (i), having a temperature (Tm) of at least 100° C. at maximum peak position of an endothermic curve obtained when measured by a differential scanning calorimeter (ii), and comprising 100 to 80 mol % of units derived from propylene, 0 to 10 mol % of units derived from ethylene and 0 to 15 mol % of units derived from an α-olefin having 4 to 12 carbon atoms (iii); and 40 to 10% by weight of a room temperature n-decane soluble component (A'-2), said room temperature n-decane soluble component (A'-2):

having an intrinsic viscosity η of 0.5 to 10 dl/g (i), and comprising 60 to 90 mol % of units derived from propylene and 40 to 10 mol % of units derived from ethylene; and 5 to 25 parts by weight of the propylene/α-olefin/ethylene terpolymer (C) defined in claim 1, provided that the total of components (A') and (C) is 100 parts by weight.

3. A polyolefin composition comprising:

45 to 90 parts by weight of a propylene block copolymer (A"), said propylene block copolymer (A') comprising: 60 to 95 parts by weight of a room temperature n-decane insoluble component (A"-1), said room temperature n-decane insoluble component (A"-1):

having an intrinsic viscosity η of 0.5 to 10 dl/g (i), having a temperature (Tm) of at least 100° C. at maximum peak position of an endothermic curve obtained when measured by a differential scanning calorimeter (ii), and comprising 75 to 100 mol % of units derived from propylene, 10 to 0 mol % of units derived from ethylene and 15 to 0 mol % of units derived from an α-olefin having 4 to 12 carbon atoms (iii); and 40 to 5 parts by weight of a room temperature n-decane soluble component (A"-2), said room temperature n-decane soluble component (A"-2):

having an intrinsic viscosity η of 0.5 to 10 dl/g (i), and comprising 60 to 90 mol % of units derived from propylene and 40 to 10 mol % of units derived from ethylene; and 5 to 40 parts by weight of the ethylene/α-olefin copolymer (B) defined in claim 1; and 2 to 25 parts by weight of the propylene/α-olefin/ethylene terpolymer (C) defined in claim 1, provided that the total of components (A"), (B) and (C) is 100 parts by weight.

4. A polyolefin composition comprising:

45 to 90 parts by weight of a propylene homopolymer or random copolymer (A'''), said propylene homopolymer or random copolymer (A'''):
having an intrinsic viscosity η of 0.5 to 10 dl/g (i),
having a temperature (Tm) of at least 100° C. at maximum peak position of an endothermic curve obtained when measured by a differential scanning calorimeter (ii), and
comprising 100 to 75 mol % of units derived from propylene, 0 to 10 mol % of units derived from ethylene and 0 to 15 mol % of units derived from an α-olefin having 4 to 12 carbon atoms (iii); 5 to 40 parts by weight of the ethylene/α-olefin copolymer (B) defined in claim 1; and 2 to 25 parts by weight of the propylene/α-olefin/ethylene terpolymer (C) defined in claim 1, provided that the total of components (A'''), (B) and (C) is 100 parts by weight.

5. A polyolefin composition comprising:

50 to 75 parts by weight of a propylene block copolymer (A'), said propylene block copolymer (A') comprising: 60 to 90% by weight of a room temperature n-decane insoluble component (A'-1), said room temperature n-decane insoluble component (A'-1):
having an intrinsic viscosity η of 0.5 to 10 dl/g (i),
having a temperature (Tm) of at least 100° C. at maximum peak position of an endothermic curve obtained when measured by a differential scanning calorimeter (ii), and
comprising 100 to 80 mol % of units derived from propylene, 0 to 10 mol % of units derived from ethylene and 0 to 15 mol % of units derived from an α-olefin having 4 to 12 carbon atoms (iii); and 40 to 10% by weight of a room temperature n-decane soluble component (A'-2), said room temperature n-decane soluble component (A'-2):
having an intrinsic viscosity η of 0.5 to 10 dl/g (i), and
comprising 60 to 90 mol % of units derived from propylene and 40 to 10 mol % of units derived from ethylene; and more than 25 parts by weight but up to 50 parts by weight of a propylene/α-olefin/ethylene terpolymer (C), said propylene/α-olefin/ethylene terpolymer (C):
having an intrinsic viscosity η of 0.5 to 10 dl/g (i), and
comprising 40 to 77 mol % of units derived from propylene, 20 to 40 mol % of units derived from an α-olefin having 4 to 12 carbon atoms and 2 to 20 mol % of units derived from ethylene;

provided that the total of components (A') and (C) is 100 parts by weight.

6. A molded article comprising the polyolefin composition as claimed in any one of claims 1 to 5.

7. A blow molded article comprising the polyolefin composition as claimed in any one of claims 1 to 5.

* * * * *